United States Patent Office 3,810,919
Patented May 14, 1974

3,810,919
CYCLOBUTENE PHOSPHORIC ACID ESTERS
Beat Böhner and Kurt Rüfenacht, Basel, Switzerland, assignors to Ciba-Geigy Corporation, Ardsley, N.Y.
No Drawing. Original application Nov. 17, 1967, Ser. No. 683,784, now Patent No. 3,600,474. Divided and this application Apr. 28, 1971, Ser. No. 50,007
Int. Cl. C07d 7/24
U.S. Cl. 260—345.2          3 Claims

ABSTRACT OF THE DISCLOSURE

New phosphoric acid esters which contain as esterifying radical a cyclobutenol radical which is fused to a ring system are produced from novel intermediates which are α-halogeno-cyclobutanones fused to a ring system. The new esters are useful as pesticides; a method of controlling pests with the aid of the new compounds as well as pesticidal compositions containing them as active ingredients are also described.

CROSS REFERENCE TO RELATED APPLICATION

This is a division of application Ser. No. 683,784, filed Nov. 17, 1967, now U.S. Pat. No. 3,600,474.

DESCRIPTION OF THE INVENTION

The present invention concerns new phosphoric acid esters having a cyclobutene ring, processes for the production thereof and for the production of new α-halogen cyclobutanones which serve as intermediates for making said novel esters, furthermore pesticidal compositions which contain the new phosphoric acid esters as active substances, as well as methods for the control of pests using the new phosphoric acid esters or compositions which contain the same as active substances, and also processes for the production of the new pesticides.

Although cyclohexenyl and cyclopentenyl phosphoric and thiophosphoric acid esters have been produced in the past and their insecticidal action tested (cf. e.g. Swiss Pat. No. 323,228, British Pat. No. 1,002,248, A. N. Pudovik, Zhur. Obschchei Khim. 25, pp. 2173–82 (1955) [C.A., 50, 8487c (1956)], B. A. Arbuzow, Jzv. Akad. SSSR, 1961, pp. 2020–2028 [C.A., 56, 11457f (1962)] and J. F. Lutsenko, Doklady Akad. Nauk. SSSR, 135, pp. 860–863 (1960) [C.A., 55, 14287b (1961)], "cyclobutene phosphoric acid esters" have not been known hitherto. By this latter term as used in this application there are meant phosphoric acid esters which are esterified by the radical of a cyclobutenol which is fused to a ring system.

It has now been found that such cyclobutene phosphoric acid esters of the General Formula I

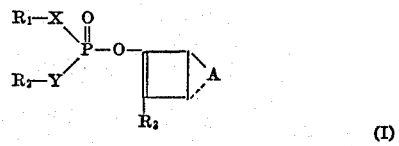

(I)

have excellent acaricidal, insecticidal and nematocidal properties. They are particularly valuable for the protection of plants and stores and for soil disinfection. In addition, these new phosphoric acid esters are also suitable for the control of pests, such as helminths or ticks, which are injurious to farm animals, domestic animals and pets.

In the General Formula I:
$R_1$ represents a lower alkyl radical, an unsubstituted phenyl radical or a phenyl radical substituted by one or several halogen atoms having an atomic number of at most 35 or by a lower alkyl radical,
$R_2$ represents a lower alkyl radical,
$R_3$ represents hydrogen, a halogen atom of an atomic number of at most 35, a lower alkyl radical, the phenyl radical or a phenyl radical substituted by one or more halogen atoms up to the atomic number 35 or by a lower alkyl radical,
X and Y represent, independently of each other, the direct bond, oxygen or an

group wherein R is a lower alkyl radical, and
A represents an unsubstituted or substituted, saturated or olefinically-unsaturated bridge having from 3 to 6 chain members, which contains as one chain member a carbon or an oxygen atom, the remaining chain members being preferably carbon atoms, and which bridge may be in its turn part of a carbocyclic ring system, in particular, in the latter case, two adjacent carbon atoms of said bridge may pertain to a phenylene-(1,2) radical.

As lower alkyl radicals R, $R_1$, $R_2$ and $R_3$ are meant those radicals having from 1 to 5 carbon atoms, in particular a methyl, ethyl, propyl, butyl or amyl radicals as substituent $R_1$ or $R_2$, a methyl, ethyl or propyl radical as substituent $R_3$ and a methyl or ethyl radical as substituent R.

The trimethylene, tetramethylene, pentamethylene and hexamethylene radical are examples for saturated 3- to 6-membered aliphatic bridges A, whilst as olefinically-unsaturated 3- to 6-membered aliphatic bridge A, for instance, the propenylene and butenylene radicals may be mentioned. As example for a 3- to 6-membered bridge A containing an oxygen atom as chain member there can be mentioned the trimethylenoxy radical and as example of a bridges A may be substituted, for instance, by halogen the o-phenylene-methylene radical. The above listed bridges A may be substituted, for instance, by halogen atoms of an atomic number of at most 35, hydroxy or epoxy groups, an alkoxycarbonylthio or alkoxythiocarbonylthio group, or by a phenylthio radical any substituents of which are selected from halogen of an atomic number of at most 35, lower albyl and nitro groups.

The new cyclobutene phosphoric acid esters of the General Formula I are produced according to the present invention by reacting an α-halogen cyclobutanone of the General Formula II

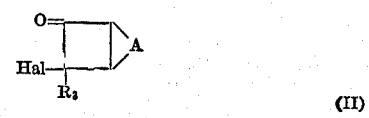

(II)

wherein

Hal represents a halogen atom up to the atomic number 35, and
$R_3$ and A have the meanings given in Formula I, with a phosphoric acid ester of the General Formula III

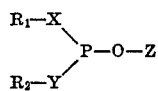
(III)

wherein

Z represents a lower alkyl radical, and
$R_1$, $R_2$, X and Y have the meanings given in Formula I, the reaction being performed in the presence or absence of a solvent or diluent.

In the process accoridng to the invention, the following can be used, e.g. as intermediates of General Formula II:

7,7-dichlorobicyclo(3.2.0)-heptan-6-one,
7,7-dibromobicyclo(3.2.0)-heptan-6-one,
7,7-dichlorobicyclo(3.2.0)-hept-2-en-6-one,
7,7-dibromobicyclo(3.2.0)-hept-2-en-6-one,
2,3-dibromo-7,7-dichlorobicyclo(3.2.0)-heptan-6-one,
7,7-dichloro-2,3-epoxybicyclo(3.2.0)-heptan-6-one,
8,8-dichlorobicyclo(4.2.0)-octan-7-one,
8,8-dichlorobicyclo(4.2.0)-oct-2-en-7-one,
8,8-dichloro-2-oxybicyclo(4.2.0)-octan-7-one,
2,2-dichloro-7H-cyclobuta(a)-indane,
10,10-dichlorobicyclo(6.2.0)-decan-9-one,
8,8-dichloro-2,5-methano-bicyclo(4.2.0)-oct-3-en-7-one,
7-chloro-7-phenyl-bicyclo(3.2.0)-hept-2-en-6-one.

In addition, α-halogen cyclobutanones which contain aromatic rings can be used as starting materials. In these, however, the ring fused to the cyclobutane ring is preferably a non-aromatic homocycle or heterocycle.

The phosphoric acid esters of General Formula III which are preferred as starting materials for the process according to the invention are those in which each of $R_1$ and $R_2$ is a lower alkyl radical such as the methyl, ethyl, a propyl, butyl or amyl radical, $R_3$ is a halogen atom of an atomic number of at most 35, the symbols X and Y are oxygen or also those phosphoric acid esters in which Y is oxygen, X is the direct bond, $R_1$ is an unsubstituted or, preferably, halogen-substituted phenyl radical, $R_2$ is a lower alkyl radical and $R_3$ is a halogen atom of an atomic number of at most 35.

In the processes according to the invention, the reaction occurs between phosphoric acid alkyl ester and α-halogen cyclobutanone while splitting off halogenoalkane and simultaneous formation of a double bond (Perkow reaction). The reaction temperatures lie within the range of 60–160° C. The reaction of the α-halogen ketones of Formula II with phosphoric acid esters of Formula III is exothermic and, in some cases, the temperature must be kept within the limits given by careful cooling. The reaction can be performed in the presence of solvents or diluents which are inert to the reaction components, e.g. saturated and aromatic hydrocarbons such as cyclohexane, hexane, benzene, toluene, xylene etc.

In a modified process, cyclobutene phosphoric acid esters of General Formula I wherein A is an olefinically unsaturated aliphatic bridge having 3 to 6 members are reacted with reactants capable of symmetrical or unsymmetrical addition to double bonds. Such reactants are, e.g.: catalytically activated hydrogen, halogen such as chlorine, bromine, iodine; ozone, hydrohalic acid, sulphuric acid, sulphurous acid, sulphinic acids, nitrosyl chloride, sulphenyl halide, hypohalite etc. These reactions can be performed in the presence of solvents or diluents. In the phosphoric acid esters of General Formula I wherein A is an olefinically unsaturated aliphatic bridge having 3 to 6 members, also substitution reactions can be performed, e.g. the Wohl-Ziegler halogenation (Houben-Weyl, vol. 5, 221 ff.) with N-halogen carboxylic acid amides or imides.

Intermediates of Formula II are obtained by a method known per se by 1,2-cyclo-addition of halogen ketenes to olefins [compare H. C. Stevens et al., J. Am. Chem. Soc,. 87, 5257 (1965) and L. Chosez et al., Tetrahedron Letters, No. [I, 135 (1966)]. The halogen ketene can first be produced from the corresponding α-halogen acetyl chloride and a tertiary organic nitrogen base or from the corresponding α-halogen acetyl bromide and zinc dust [according to W. T. Brady; J. Org. Chem., 31, 626 (1966)] in an inert solvent. After undesirable side products have been removed from the solution of the halogen ketene the latter is reacted with an olefin .

Some of the α-halogen cyclobutanones of General Formula II are known. Novel α-halogen cyclobutanones correspond to the General Formula IV

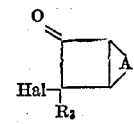
(IV)

wherein

Hal represents a halogen atom up to the atomic number 35,
$R_3$ represents hydrogen, a halogen atom up to the atomic number 35, a lower alkyl radical, an unsubstituted phenyl radical or a phenyl radical substituted by one or more halogen atoms of an atomic number of at most 35 or by a lower alkyl radical,
A' represents an unsubstituted or substituted, saturated or olefinically-unsaturated aliphatic bridge having 4 to 6 chain members which may contain as one chain member an oxygen or carbon atom, the remaining chain members being preferably carbon atoms, and which bridge may be in its turn part of a carbocyclic ring system, and are obtained by reacting olefins of the General Formula V

(V)

wherein A' has the meaning given above, with a halogen ketone.

Rather than a halogen ketone, preferably a precursor thereof such as an α-halogen acyl halide is used in the presence of a tertiary nitrogen base and a solvent or diluent. In certain cases it is of advantage to prepare the olefin together with the tertiary organic base and then add the α-halogen acyl chloride. This method is chiefly suitable for olefins which contain basic groups. The tertiary organic base, however, must be stronger than the olefin containing a basic group. Otherwise, the tertiary organic base is not used and instead double the amount of olefin is used.

Either equimolar amounts of the reaction partners are combined or one of them, particularly the olefin can be used in up to 10 times excess. If a greater excess of the olefin component is used it is often advantageous to leave out the solvent.

The cyclo addition is performed within a temperature range of —10° to 160° C., preferably from 20–120° C.

If the α-halogen cyclobutanones of General Formula II have an olefinically-unsaturated radical as bridge A, then the addition and substitution reactions mentioned above such as catalytic hydrogenation, halogen and hydrohalic acid addition, the Wohl-Ziegler halogenation (loc. cit.) or the epoxidation, can be performed before the reaction with esters of trivalent phosphorus. According to the invention, the reaction products so obtained can then be reacted in the manner described with trivalent phosphorus compounds.

The phosphoric acid esters of General Formula III can be obtained by known processes (cf. Kosolapoff, "Organophosphorus Compounds," Wiley, 1950).

In the purified state, the new cyclobutene phosphoric acid esters of General Formula I are colorless oils which dissolve well in organic solvents but are insoluble in water.

Tests of the action of compounds of the General Formula I on insects and spiders showed that these active substances are good to very good contact and stomach poisons and, at the same time, they have a marked systemic action.

It has been found that the active compounds of General Formula I have an excellent protracted action on insects of the families Muscidae, Stomoxidae and Culicidae, e.g. the polyvalent resistent and normally sensitive house flies (*Musca domestica*), stable flies (*Stomoxys calcitrans*) and mosquitoes (e.g. *Aedes aegypti, Culex fatigans, Anopheles stephensi*), on insects of the families Curculionidae, Bruchidae, Dermestidae, Tenebrionidae and Chrysomelidae, e.g. granary weevils (*Sitophilus granaria*), bean beetles (*Bruchidius obtectus*), larder beetles (*Dermestes vulpinus*), yellow meal worms (*Tenebrio molitor*), Colorado potato beetles (*Leptinotarsa decemlineata*) and their stages of development, on the Pyralididae family, e.g. Mediterranean flour moths (*Ephestia kunniella*), the Blattidae family, e.g. cockroaches (*Phyllodromia germanica, Periplaneta americana, Blatte orientals*), the Aphididae family, e.g. bean aphids (*Aphis fabae*) and the Pseudococcidae family, e.g. citrus mealybugs (*Planococcus citri*) and the family Locustidae, migratory locusts (*Locusta migratoria*). Tests on the aphids and locusts mentioned indicate an excellent systemic action.

In contrast thereto, O,O - diethyl - O - cyclohexenyl phosphate [A. N. Pudovik, los. cit.] only has slight insecticidal properties.

In addition, the active substances according to the invention have a good action on the larval and adult stages of spiders, e.g. of the families of Tetranychidae, Ixodidae, Arachnidae, Argasidae.

Pests against which compounds falling under Formula I are found to be particularly active are, for instance aphids, larvae of *Aedes aegypti*, cockroaches, ticks, e.g. a Diazinon-resistant strain of Boophilus microplus, Stomoxys maggots and soil nematodes, e.g. *Meloidogyne arenaria*.

Effective amounts of these active substances ranged from 0.01 to 20 milligrams per square meter of an area in which the aforesaid pests had to be controlled. Against nematodes and also in cases where systemic effects had to be achieved, against *Aphis fabae*, amounts of up to 5 to 20 g. per square meter, corresponding to concentrations of 25 to 100 p.p.m. in a 20-cm. deep treated layer of soil are recommended.

In admixture with synergists and auxilaries having a similar action such as succinic acid dibutyl ester, piperonyl butoxide, olive oil, peanut oil etc., the range of action of the active substances mentioned is broadened and, in particular, the insecticidal and acaricidal action is improved. In the same way, the insecticidal action can be substantially broadened and adapted to the prevailing circumstances by the addition of other insecticides such as phosphoric, phosphonic, thiophosphoric and dithiophosphoric acid esters and amides, carbamic acid esters, halogenated hydrocarbons, analogues of DDT active substances, pyrethrines and synergists thereof.

The following examples illustrate the production of the new cyclobutene phosphoric acid esters of the general Formula I. Where not otherwise stated, parts and percentages are given by weight, the temperatures are in degrees centigrade. The examples are not intended to limit the scope of the invention.

EXAMPLE 1

A mixture of 50 parts of 7,7-dichlorobicyclo(3.2.0)-hepten-(2)-one-(6) [L. Ghosez et al., Tetrahedron Letters, No. 1, 135 (1966)] and 37 parts of trimethyl phosphite is heated to 100° whereupon methyl cholride begins to split off. The heating bath is removed and the mixture is so cooled that the temperature varies between 100 and 120°. On completion of the exothermic reaction, the whole is stirred for 3 hours at 120°. At the end of this time, 7,7-dichlorobicyclo(3.2.0) - hepten-(2)-one-(6) is no longer visible by thin layer chromatography.

After distillation in vacuo, 60 parts of O,O-dimethyl-O-[7 - chloro-bicyclo(3.2.0)-hept-2,6-dienyl-(6)]-phosphate are obtained, B.P. 94–95°/0.001 torr.

EXAMPLE 2

A solution of 32.6 parts of bromine in 240 parts of carbon tetrachloride is added to a solution of 50 parts of O,O - dimethyl-0-[7-chloro-bicyclo(3.2.0)-hept-2,6-dienyl-(6)]-phosphate in 560 parts of carbon tetrachloride, the addition being made dropwise while cooling to 20°. On completion of the addition, the reaction mixture is stirred for another 2 hours at 20° after which the solvent and excess bromine are distilled off. The residue is fractionated in vacuo.

The O,O - dimethyl - 0-[2,3-dibromo-7-chloro-bicyclo (3.2.0) - hept-6-enyl-(6)]-phosphate boils at 141–145° under 0.02 torr.

EXAMPLE 3

A solution of 22.6 parts of O,O-dimethyl-0-[7-chloro-bicyclo(3.2.0)-hept-2,6-dienyl-(6)]-phosphate in 400 parts of anhydrous dioxane is hydrogenated at room temperature under normal pressure in the presence of 4 parts of prehydrogenated Pt-C (5%) catalyst until no more hydrogen is taken up.

After filtering off the catalyst and distilling off the solvent, the residue is fractionated in vacuo.

The O,O - dimethyl-0-[7-chloro-bicyclo(3.2.0)-hept-6-en-(6)-yl]-phosphate boils at 90–92° under 0.005 torr.

EXAMPLE 4

A solution of 35.8 parts of 4-chlorophenyl sulphenyl chloride in 150 parts by volume of carbon tetrachloride is added dropwise at 0–5° to a solution of 50 parts of O,O-dimethyl-0-[7-chloro-bicyclo(3.2.0)-hepta-2,6-dienyl-(6)]phosphate in 250 parts by volume of carbon tetrachloride. The reaction mixture is then stirred for 2 hours at room temperature and then the solvent is distilled off in vacuo. The oily residue solidifies on cooling. After recrystallizing from benzene/petroleum ether, the O,O-dimethyl - 0-[2(3),7-dichloro-3(2)-4'-chlorophenyl-thiobicyclo(3.2.0)hepten - (6)-yl-(6)]-phosphate melts at 92–93°.

EXAMPLE 5

A solution of 200 parts of O,O-diethyl-0-[7-chloro-bicyclo-(3.2.0)-hept-2,6-dienyl-(6)]-phosphate in 1000 parts of glacial acetic acid and 157 parts of 38.2% peracetic acid are left to stand for 4 days at room temperature. 2000 parts of water are then added to the mixture which is then extracted three times with 700 parts by volume of petroleum ether each time. After washing with saturated bicarbonate solution and drying over potash, the solvent is evaporated off in vacuo whereupon 21 parts of starting material are regained.

The aqueous phase is then extracted several times with ether. After washing with bicarbonate solution and drying over potash, 138 parts of a dark brown colored oil are obtained as crude product.

A sample of the crude O,O-diethyl-O-[7-chloro-2,3-epoxy-bicyclo-(3.2.0)-hepten-(6)-yl-(6)]-phosphate boils at 152–155°/0.003 torr.

With the exception of the phosphoric acid esters Nos. 6 and 8 which are obtained by subsequently brominating the cycloalkadienyl phosphoric acid of Example 1 with bromine in carbon tetrachloride in the way described in Example 2, the cyclobutene phosphoric acid esters of Formula I wherein $R_1$, $R_2$, X, Y and A have the meanings listed in the following table are prepared in the manner described in Example 1 on using equivalent amounts of the corresponding α-halogen cyclobutanone and the corresponding trialkyl phosphite.

| No. | R₁ | R₂ | R₃ | X | Y | A | M.P. or B.P./torr in °C. |
|---|---|---|---|---|---|---|---|
| 1 | C₂H₅ | C₂H₅ | Cl | O | O | —CH=CH—CH₂— | 96–99/0.007 |
| 2 | i-C₃H₇ | i-C₃H₇ | Cl | O | O | —CH=CH—CH₂— | 104–105/0.02 |
| 3 | CH₃ | CH₃ | Br | O | O | —CH=CH—CH₂— | 95–100/0.001 |
| 4 | C₂H₅ | C₂H₅ | Br | O | O | —CH=CH—CH₂— | 96–99/0.002 |
| 5 | C₂H₅ | C₂H₅ | Cl | O | O | —CH₂—CH₂—CH₂— | 75–76/0.001 |
| 6 | C₂H₅ | C₂H₅ | Cl | O | O | —CHBr—CHBr—CH₂— | 148–150/0.03 |
| 7 | C₂H₅ | C₂H₅ | Cl | O | O | —CHCl—CHCl—CH₂— | 130–135/0.01 |
| 8 | CH₃ | CH₃ | Br | O | O | —CHBr—CHBr—CH₂— | Undest. |
| 9 | CH₃ | CH₃ | Cl | O | O | —CHBr—CHBr—CH₂— | 138–145/0.002. |
| 10 | CH₃ | CH₃ | Cl | O | O | —CH=CH—CHBr— | 128–131/0.02. |
| 11 | C₂H₅ | C₂H₅ | Cl | O | =N—C₂H₅ | —CH=CH—CH₂— | 107–112/0.025. |
| 12 | n-C₃H₇ | CH₃ | Cl | O | O | —CH=CH—CH₂— | 95–98/0.005. |
| 13 | n-C₃H₇ | CH₃ | Cl | O | O | —CHBr—CHBr—CH₂— | 149–153/0.015. |
| 14 | i-C₃H₇ | CH₃ | Cl | O | O | —CH=CH—CH₂— | 112–116/0.0004. |
| 15 | i-C₅H₁₁ | i-C₅H₁₁ | Cl | O | O | —CH=CH—CH₂— | Undest. |
| 16 | CH₃ | i-C₅H₁₁ | Cl | O | O | —CHBr—CHBr—CH₂— | Undest. |
| 17 | C₂H₅ | C₂H₅ | Cl | O | O |  —CH=CH—CH— with S(CH₃)₃ | 135/0.001.[1] |
| 18 | C₂H₅ | C₂H₅ | Cl | O | O | —CH=CH—CH— with SCOOC₂H₅ | 125/0.0001.[1] |
| 19 | C₂H₅ | C₂H₅ | Cl | O | O | —CH₂—CH₂—CH₂—CH₂— | 100–101/0.001. |
| 20 | CH₃ | CH₃ | Cl | O | O | —CH₂—CH₂—CH₂—CH₂—CH₂— | 115–118/0.002. |
| 21 | C₂H₅ | C₂H₅ | Cl | O | O | —CH₂—CH₂—CH₂—CH₂—CH₂—CH₂— | 126–143/0.001–0.02. |
| 22 | CH₃ | CH₃ | Cl | O | O |  | 154–155/0.01. |
| 23 | C₂H₅ | C₂H₅ | Cl | O | O | Same as above | 138–146/0.006. |
| 24 | CH₃ | CH₃ | Cl | O | O | —O—CH₂—CH₂—CH₂— | Undest. |
| 25 | C₂H₅ | C₂H₅ | Cl | O | O | —O—CH₂—CH₂—CH₂— | 101–103/0.007. |
| 26 | C₂H₅ | C₂H₅ | 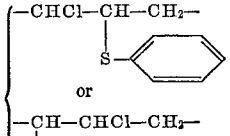 | O | O | —CH=CH—CH₂— | 135–140/0.002. |
| 27 | C₂H₅ | C₂H₅ | Cl | O | O | —CH=CH—CH₂—CH₂— | 109–111/0.03. |
| 28 | C₂H₅ | C₂H₅ | Cl | O | O | —CH=CH—CHBr— | 129–130/0.005. |
| 29 | C₂H₅ | C₂H₅ | Br | O | O | —CHBr—CHBr—CH₂— | Undest. |
| 30 | CH₃ | CH₃ | CH₃ | O | O | —CH=CH—CH₂— | 95–97/0.017. |
| 31 | C₂H₅ | C₂H₅ | CH₃ | O | O | —CH=CH—CH₂— | 109–115/0.02. |
| 32 | CH₃ | CH₃ | Cl | O | O | 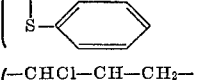 | Undest. |
| 33 | CH₃ | CH₃ | Cl | O | O | 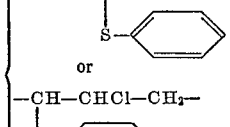 | Undest. |
| 34 | C₂H₅ | C₂H₅ | Cl | O | O | 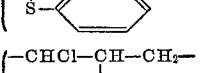 | Undest. |
| 35 | C₂H₅ | C₂H₅ | Cl | O | O | 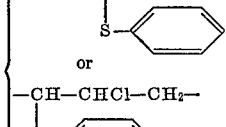 | Undest. |
| 36 | C₂H₅ | C₂H₅ | Cl | O | O | 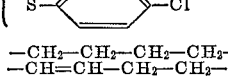 | 37–40. |
| 37 | C₂H₅ | C₂H₅ | Cl | O | O | 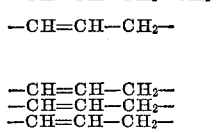 | 37–40. |
| 38 | CH₃ | CH₃ | Cl | O | O | —CH₂—CH₂—CH₂—CH₂— | 130–134/0.01. |
| 39 | CH₃ | CH₃ | Cl | O | O | —CH=CH—CH₂—CH₂— | 111–115/0.01. |
| 40 | 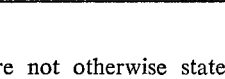 | C₂H₅ | Cl | | O | —CH=CH—CH₂— | Undest. |
| 41 | Same as above | CH₃ | Cl | O | O | —CH=CH—CH₂— | 120/0.0005.[1] |
| 42 | do | C₂H₅ | Cl | O | | —CH=CH—CH₂— | Undest. |
| 43 | do | C₂H₅ | Cl | | | —CH=CH—CH₂— | Undest. |

[1] Molecular dest.

The production of new α-halogen cyclobutanones of the General Formula II is described below. These were used as starting materials for the phosphoric acid esters listed under the respective numbers in the preceding table.

Where not otherwise stated, parts and percentages are given as parts by weight and the temperatures are in degrees centigrade.

AD ESTERS NOS. 3 AND 4

A solution of 19.8 parts of triethylamine in 65 parts of petroleum ether is added dropwise to a solution of 38.8 parts of cyclopentadien and 46.3 parts of dibromoacetyl chloride in 130 parts of petroleum ether, the addition being made at reflux temperature. On completion of the addition, the reaction mixture is cooled and the triethylamine hydrochloride is filtered off. The excess cyclopentadien and the solvent are distilled off in vacuo. The residue is fractionated.

The 7,7-dibromo-bicyclo(3.2.0)-hept-2-en - 6 - one boils at 60–61° under 0.006 torr.

AD ESTER NO. 6

A solution of 17 parts of bromine in 70 parts by volume of carbon tetrachloride is added dropwise to a solution of 17.7 parts of 7,7-dichloro-bicyclo(3.2.0)-hepten-(2)-one-(6) in 70 parts by volume of carbon tetrachloride. On completion of the addition, the reaction mixture is stirred for 2 hours at room temperature. The solvent is then distilled off and the residue is fractionated.

1st fraction: 4-bromo-7,7-dichloro-bicyclo(3.2.0)-hepten-(2)-one-(6), B.P. 89–92°/0.38 torr.
2nd fraction: 2,3-dibromo - 7,7 - dichloro-bicyclo(3.2.0)-hepten - (2) - one(6) (main fraction), B.P. 111–112°/0.38 torr.

AD ESTER 19

A solution of 13.6 parts of triethylamine in 60 parts of cyclohexene is added dropwise while stirring to a solution of 120 parts of cyclohexene and 20 parts of dichloracetyl chloride. On completion of the addition, the reaction mixture is cooled and precipitated triethylamine hydrochloride is removed. The excess cyclohexene is distilled off and the residue is fractionated in vacuo.

The 8,8-dichloro-bicyclo(4.2.0) - octan - 7 - one boils at 46–47° under 0.001 torr.

AD ESTERS NOS. 20 AND 21

A solution of 30.3 parts of triethylamine in 150 parts of cyclo-octene is added dropwise, while stirring at 100°, to a solution of 500 parts of cyclo-octene and 44.3 parts of dichloracetyl chloride. On completion of the addition, the reaction mixture is cooled and the precipitated triethylamine hydrochloride is filtered off. The filtrate is fractionated in vacuo. The 10,10 - dichloro - bicyclo(6.2.0)-decan-9-one boils at 100–102° under 0.005 torr.

AD ESTERS NOS. 22 AND 23

A solution of 55.5 parts of triethylamine in 150 parts of light gasolene is added dropwise at 80° while stirring to a solution of 87 parts of indene and 80 parts of dichloracetyl chloride in 440 parts of light gasolene. On completion of the addition, the reaction mixture is cooled and the precipitated triethylamine hydrochloride is filtered off. The excess indene and light gasolene are distilled off in vacuo. The residue which remains is crystalline.

Recrystallized from isopropanol, 2,2-dichloro-7H-(a)-indane melts at 75°.

AD ESTERS NOS. 24 AND 25

A solution of 67 parts of triethylamine in 74 parts of petroleum ether is added dropwise, while stirring at 35°, to a solution of 166 parts of dihydropyrane and 98 parts of dichloracetyl chloride in 740 parts of petroleum ether. On completion of the addition, the reaction is stirred for some hours at room temperature and then the precipitated triethylamine hydrochloride is filtered off. The filtrate is cooled with ice whereupon the desired reaction product crystallizes out. The 8,8-dichloro-2 - oxa - bicyclo(4.2.0)-octan-7-one melts at 70°.

AD ESTER NO. 26

A solution of 60 parts of triethylamine in 320 parts of petroleum ether is added dropwise, while stirring at 40°, to a solution of 178 parts of cyclopentadien and 103 parts of α-chloromandelic acid chloride in 960 parts of petroleum ether. On completion of the addition, the reaction mixture is cooled and precipitated triethylamine hydrochloride is filtered off. The filtrate is fractionated under vacuum. The 7-chloro-7-phenyl-bicyclo(3.2.0)-hept-4-en-6-one boils at 100–102° under 0.07 torr.

AD ESTER NO. 27

31.8 parts of triethylamine in 150 parts of diethyl ether are added while stirring vigorously to a solution of 50 parts of cyclohexadien and 46.1 parts of dichloracetyl chloride in 150 parts of anhydrous diethyl ether, the addition being so made that the temperature of the reaction mixture is 35°. The triethylamine hydrochloride which precipitates after cooling is filtered off, the non-reacetd cyclohexadien and the ether are distilled off and the oily residue is fractionated in vacuo.

The 8,8-dichloro-bicyclo(4.2.0)-octan - 7 - one boils at 69–70° under 0.6 torr.

AD ESTER NO. 28

100 parts of 7,7-dichloro-bicyclo(3.2.0)-hepten-(2)-one-(6), 100 parts of N-bromosuccinimide, 0.5 part of dibenzoyl peroxide and 800 parts by volume of carbon tetrachloride are refluxed for 24 hours. The precipitated succinimide is separated and the filtrate is distilled in vacuo.

The 4 - bromo-7,7-dichloro-bicyclo(3.2.0)-hepten-(2)-one-(6) distills at 107–110°/3 torr and crystallizes. After recrystallization from benzene/petroleum ether, it melts at 77–78°.

The pesticides according to the invention are produced by known methods by intimately mixing and milling active substances of General Formula I with suitable carriers, optionally with the addition of dispersing agents or solvents which are inert to the active substances. The new active substances can be worked up into dusts, sprinkling agents, granulates (coated granulates, impregnated granulates and homogeneous granulates), wettable powders, pastes, emulsions, solutions or aerosols.

The concentration of active substance in these compositions is 0.01–80% by weight. The compositions according to the invention can be admixed with other biocidal active substances or agents. Thus, to broaden their range of action, they can contain, in addition to the active substances mentioned of the General Formula I, e.g. other insecticides, fungicides, bactericides, fungistatica, bacteriostatica or nematocides. In addition, the compositions according to the invention can also contain synthetic fertilizers, trace elements, etc.

The phosphoric acid esters of Formula I which have an anthelmintic action can be administered to the animals orally or via the abomasum in the form of solid or liquid preparations, e.g. as solutions, emulsions, suspensions (drenches), powders, tablets, boluses and capsules. The active substances or compositions containing them can also be added to the feed or drinks.

The new active substances are used for soil disinfection in the form of solid or liquid agents. For soil disinfection those compositions are particularly advantageous which provide an even distribution of the active substance throughout a layer of 15 to 25 cm. deep soil. The mode of application and form of composition to be applied are dependent, in particular, on the type of soil pests to be combated, the climate and soil conditions. As the new active substances are not phytotoxic and do not have an adverse effect on the germination of seeds they can also be used without allowing for a so-called waiting time and they can be used during the growth of the cultivated plants.

The following forms of pesticides according to the invention illustrate the invention; where not otherwise expressly stated parts and percentages are given by weight.

DUSTS

The following components are used to produce (a) a 10% and (b) a 2% dust:

(a)

| | Parts |
|---|---|
| O,O - dimethyl - [7 - chloro-bicyclo(3.2.0)-hept-2,6-dienyl-(6)]-phosphate | 10 |
| Highly dispersed silicic acid | 5 |
| Talcum | 85 |

(b)

| | Parts |
|---|---|
| O,O-di-ethyl - O - [7-chloro-bicyclo(3.2.0)-hept-2,6-dienyl-(6)]-phosphate | 2 |
| Highly dispersed silicic acid | 1 |
| Talcum | 97 |

The active substances are mixed and milled with the carriers. The dusts obtained are suitable, e.g. for combating cockroaches and ants indoors.

SPRINKLING AGENT

To produce a 25% sprinkling agent, the following components are used:

| | Parts |
|---|---|
| O,O-dimethyl - O - [7-bromo-bicyclo(3.2.0)-hept-2,6-dienyl-(6)]-phosphate | 25 |
| Combination emulsifier (alkylaryl polyethylene glycol/alkylaryl sulphonate calcium salt) | 0.25 |
| Kieselguhr | 50 |
| Calcium sulphate (aqueous) | 24.75 |

The active substance is intimately mixed with the emulsifier and the kieselguhr and then the calcium sulphate is added. A sprinkling agent is obtained which is suitable in particular for soil disinfection.

WETTABLE POWDERS

The following components are used to produce (a) a 50% and (b) a 10% wettable powder:

(a)

| | Parts |
|---|---|
| O,O-diethyl-O-[7-chloro-2,3-dibromo - bicyclo(3.2.0)-hepten-(6)-yl-(6)]-phosphate | 50 |
| Naphthalene sulphonic acid/benzene sulphonic acid/formaldehyde condensate | 5 |
| Champagne chalk | 5 |
| Silicic acid | 20 |
| Kaolin | 15 |
| Oleoyl methyl tauride sodium salt | 5 |

(b)

| | Parts |
|---|---|
| O,O-dimethyl - O - [2,3,7 - tribromo-bicyclo(3.2.0)-hepten-(6)-yl-(6)]-phosphate | 10 |
| Mixture of the sodium salts of saturated fatty alcohol sulphates | 3 |
| Naphthalene sulphonic acid/formaldehyde condensate | 5 |
| Kaolin | 82 |

The active substances are intimately mixed with the additives in suitable mixers and the mixture is milled in suitable mills and rollers. Wettable powders are obtained which can be diluted with water to form suspensions of any concentration desired. Such suspensions can be used to combat insects which injure by eating and sucking, as well as for combating ticks in pets and domestic animals.

EMULSION CONCENTRATE

To produce a 25% emulsion concentrate:

| | Parts |
|---|---|
| O,O - diethyl- - O - [7 - chloro - 4 - bromo - bicyclo(3.2.0) - hepta-2,6-dienyl-(6)]-phosphate | 25 |
| Epichlorohydrin | 2.5 |
| Combination emulsifier (alkylaryl polyethylene glycol/alkylaryl sulphonate sodium salt) | 5 |
| Xylene | 67.5 | are mixed together. This concentrate can be diluted with water to form emulsions in concentrations suitable for the protection of plants and stores. Such emulsions are suitable in particular for the combating of ticks in pets and domestic animals.

We claim:

1. A compound of the formula $$\begin{array}{c} R_1-X \\ \phantom{R_1-X}\diagdown \\ \phantom{R_1-X}P-O \\ R_2-Y \diagup \phantom{P} \\ \phantom{xxxxxx} | \\ \phantom{xxxxxx} R_3 \end{array}$$

wherein
  $R_1$ represents lower alkyl, phenyl, or chlorine-, bromine-, or lower alkyl-substituted phenyl,
  $R_2$ represents lower alkyl,
  $R_3$ represents hydrogen, chlorine, bromine, lower alkyl, phenyl, or chlorine-, bromine-, or lower alkyl-substituted phenyl,
  each of X and Y represents independently of the other the direct bond, oxygen or the group $$-\underset{R}{\overset{}{N}}-$$

in which R is lower alkyl.

2. A compound as defined in claim 1 which is O,O-dimethyl - O - [8 - chloro - 2 - oxabicyclo(4.2.0)-oct-7-en-(7)-yl]-phosphate.

3. A compound as defined in claim 1 which is O,O-diethyl - O - [8 - chloro - 2 - oxabicyclo(4.2.0)-oct-7-en(7)-yl]-phosphate.

References Cited
UNITED STATES PATENTS
2,583,744   1/1952   Schrader et al.   260—343.2

JOHN M. FORD, Primary Examiner

U.S. Cl. X.R.

260—957; 424—203

UNITED STATES PATENT OFFICE
CERTIFICATE OF CORRECTION

Patent No. 3,810,919                    Dated May 14, 1974

Inventor(s) Beat Böhner and Kurt Rüfenacht

It is certified that error appears in the above-identified patent and that said Letters Patent are hereby corrected as shown below:

Insert the following information in the Heading:

Claims priority, application Switzerland, November 21, 1966, No. 16667/66

Signed and sealed this 17th day of September 1974.

(SEAL)
Attest:

McCOY M. GIBSON JR.
Attesting Officer

C. MARSHALL DANN
Commissioner of Patents